US012219260B2

(12) United States Patent
Tan

(10) Patent No.: US 12,219,260 B2
(45) Date of Patent: Feb. 4, 2025

(54) DISPLAY DEVICE, METHOD AND COMPUTER READABLE MEDIUM FOR MODULATING CAPTURING VIEW

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jia-Lin Tan, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/208,801

(22) Filed: Jun. 12, 2023

(65) Prior Publication Data
US 2023/0328381 A1 Oct. 12, 2023

(30) Foreign Application Priority Data
Jan. 31, 2023 (CN) .......................... 202310117321.9

(51) Int. Cl.
*H04N 23/695* (2023.01)
*G06F 3/01* (2006.01)
*G06T 11/00* (2006.01)
*H04N 23/54* (2023.01)

(52) U.S. Cl.
CPC ........... *H04N 23/695* (2023.01); *G06F 3/012* (2013.01); *G06T 11/00* (2013.01); *H04N 23/54* (2023.01)

(58) Field of Classification Search
CPC ...... H04N 23/695; H04N 23/54; G06F 3/012; G06T 11/00
See application file for complete search history.

(56) References Cited

U.S. PATENT DOCUMENTS

| 11,266,919 B2* | 3/2022 | Bear ...................... G06F 3/0346 |
| 2015/0312468 A1* | 10/2015 | Taylor .................. H04N 13/378 348/47 |
| 2018/0077329 A1* | 3/2018 | Long .................... H04N 23/661 |

(Continued)

FOREIGN PATENT DOCUMENTS

| CN | 114563018 A | 5/2022 |
| TW | 202127105 A | 7/2021 |

*Primary Examiner* — Matthew A Eason
*Assistant Examiner* — Sujit Shah
(74) *Attorney, Agent, or Firm* — ScienBiziP, P.C.

(57) ABSTRACT

A display device, a method, and a non-transitory computer readable medium for modulating capturing view are provided, the display device is wearable on a user's head and includes an image capturing module, a motion capturing module, and a control module; the image capturing module captures an environment image, the image capturing module is movably arranged; the motion capturing module obtains an inclined angle through measuring a posture of the user's head; the control module compares the inclined angle to a predetermined angle, to obtain an angle difference between the inclined angle and the predetermined angle, and controls the image capturing module to move to adjust a position when the angle difference is greater than an angle threshold value, rendering a degree of overlapping of a field of view of the image capturing module and a field of view of the user reaches a predetermined degree of overlapping.

15 Claims, 9 Drawing Sheets

(56) References Cited

U.S. PATENT DOCUMENTS

| | | | | |
|---|---|---|---|---|
| 2020/0029050 A1* | 1/2020 | Antunes | ............... | H04N 23/50 |
| 2021/0152780 A1* | 5/2021 | Hanayama | ........... | H04N 23/683 |
| 2021/0350574 A1* | 11/2021 | Sours | .................... | G09G 5/003 |
| 2023/0046325 A1* | 2/2023 | Toyota | ................ | A61B 5/6803 |

* cited by examiner

DISPLAY DEVICE, METHOD AND COMPUTER READABLE MEDIUM FOR MODULATING CAPTURING VIEW

CROSS-REFERENCE TO RELATED APPLICATIONS

This application claims priority to Chinese Patent Application No. 202310117321.9 filed on Jan. 31, 2023 in China National Intellectual Property Administration, the contents of which are incorporated by reference herein.

FIELD

The subject matter herein generally relates to Augmented Reality (AR) display technology, and particularly to a display device, a method and a non-transitory computer readable medium for modulating capturing view.

BACKGROUND

Augmented Reality (AR) is a display technology that integrates virtual information with the real world. That is, based on the real world observed by the human eye, the virtual image information projected by an electronic device is integrated. Traditionally head-mounted AR display devices usually include a camera for capturing images within the viewer's field of view, and project virtual image information to a preset position within the viewer's field of view according to the captured image.

However, the camera in the traditional AR glasses is fixed on the AR glasses, and its capturing angle cannot be adjusted, and it is usually applicable to head-up scenes. Furthermore, when the user uses it in multiple scenes, for example, the user needs to look up, look down, and watch close-ups, etc., it will cause the field of view seen by the user's eyes to be inconsistent with the field of view tracked by the camera.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when utilized, means "including, but not necessarily limited to", it specifically indicates open-ended inclusion or membership in the so-described combination, group, series, and the like.

Augmented Reality (AR) is a display technology that integrates virtual information with the real world. That is, based on the real world observed by the human eye, the virtual image information projected by an electronic device is integrated. Traditionally head-mounted AR display devices usually include an image capturing module and a display device for capturing images within the viewer's field of view, and project virtual image information to a preset position within the viewer's field of view according to the captured image.

Figure 1:
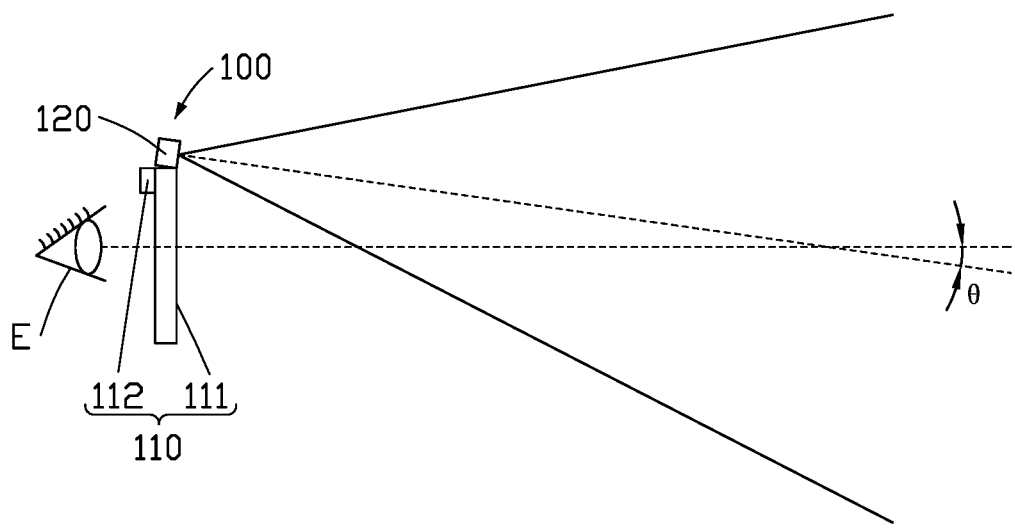
FIG. 1 illustrates a schematic diagram of an embodiment of a scene for a display device according to the present disclosure.

FIG. 1 illustrates a traditional display device 100 including a display module 110 and an image capturing module 120. The display device 100 may be a display device based on Augmented Reality (AR). The display module 110 includes a transparent waveguide plate 111 and an optical mechanism 112. The waveguide plate 111 may be arranged on a stare direction of human eyes E. The optical mechanism 112 is configured to emit image light to the waveguide plate 111, so the waveguide plate 111 may transmit light from a side away from the human eyes E, meanwhile display the image light emitted by the optical mechanism 112, therefore the human eyes E may see information of real world and virtual information projected by the optical mechanism 112, which is AR display.

The waveguide plate 111, usually based on a principle of optical grating and total reflection, that is the image light emitted by the optical mechanism 112 is transmitted on the waveguide plate 111, continually performs total reflection along two sides of the waveguide plate 111 in an action of the optical grating, the image light is reflected to the human eyes E. During the procedure, the image light emitted by the optical mechanism 112 diffuses, so as to form a display area 1101 (shown in FIG. 3) in a field of view of the human eyes E. In detail, the display area 1101 is an area of the display module 110 for display virtual images in the field of view of the human eyes E. Normally, the virtual image displayed by the display module 110 may not cover all the field of view of the human eyes E, but covering a part of it, the area of the display module 110 that can display images in the field of view of the human eyes E is the display area 1101 (shown in FIG. 3).

In the display device 100, the display module 110 can only project the virtual images to the human eyes, so as to additionally display the virtual images based on the real world. However, in a situation of the scene information of the real world is not obtained, the images displayed by the display module 110 can not be relevant to the real world scene, if further performing AR function, presetting positions for the virtual images adding to the real world are needed, so the image capturing module 120 is needed for synchronously capturing scene information in the field of view of the human eyes E, therefore the display module 110 can interact according to the scene stared by the human eyes E. That is, a real scene area (that is a capturing area 1201, shown in FIG. 3) captured by the image capturing module 120 and the display area 1101 have an overlapped area, which can be an effective range F1 for performing AR function.

Figure 2:
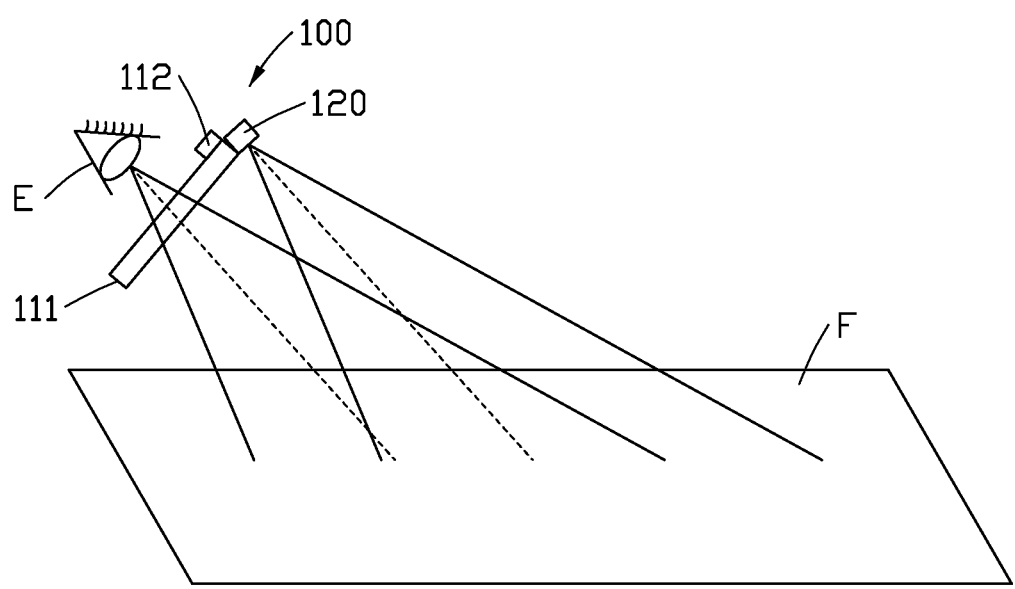
FIG. 2 illustrates another schematic diagram of an embodiment of a scene for the display device according to the present disclosure.
Figure 3:
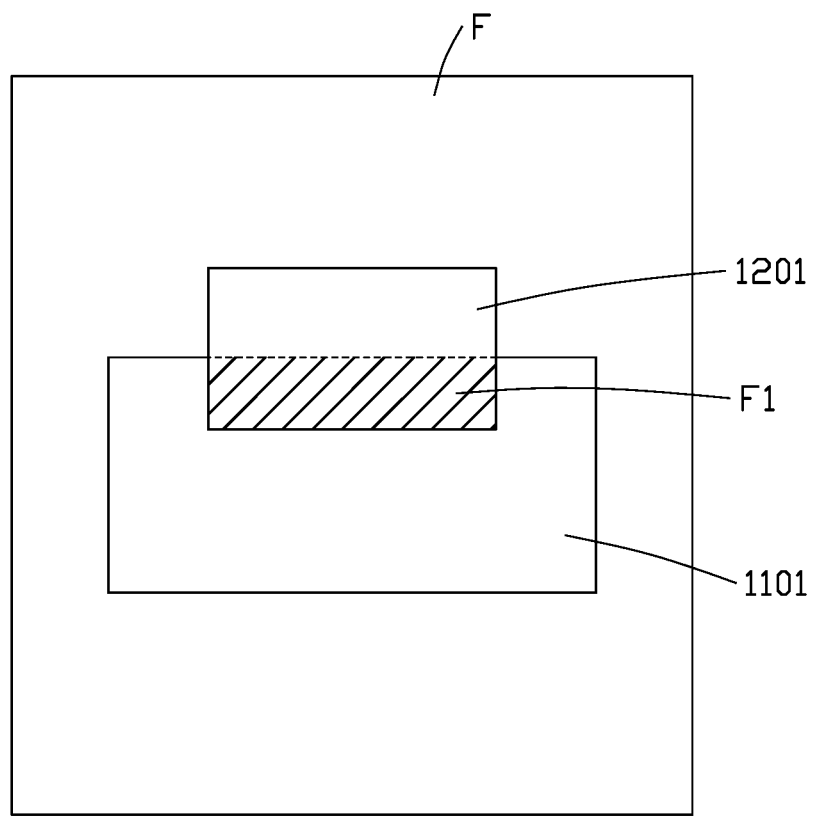
FIG. 3 illustrates a schematic diagram of an embodiment of a display area formed by human's field of view and a capturing area of an image capturing module of a traditional display device.

Referring to FIGS. 1, 2, and 3, the display device 100 can only be applied in a horizontal view scene, but cannot perform AR function in a downward view scene, an upward view scene, and/or a close shot scene. In detail, on one hand, the display device 100 applied in the horizontal view scene, since the image capturing module 120 needs to capture images of the scene in the field of view of the human eyes E, the image capturing module 120 cannot be directly arranged to the positions of the human eyes E. Normally, the image capturing module 120 is arranged above the human eyes E, that is above the waveguide plate 111, for capturing images of the scene in the field of view of the human eyes E, an optical axis of the image capturing module 120 is downwardly inclined to a stare direction of the human eyes E with a certain angle, normally, an optical axis of the display module 20 and the optical axis of the image capturing module 120 have an included angle θ. Therefore, in the downward view scene, the upward view scene, and/or the close shot scene, the effective range F1 of the overlapped area of the display area 1101 in a plane F in the downward view scene, the upward view scene, and/or the close shot scene and the capturing area 1201 is smaller, rendering the AR function cannot be fully performed.

Figure 4:
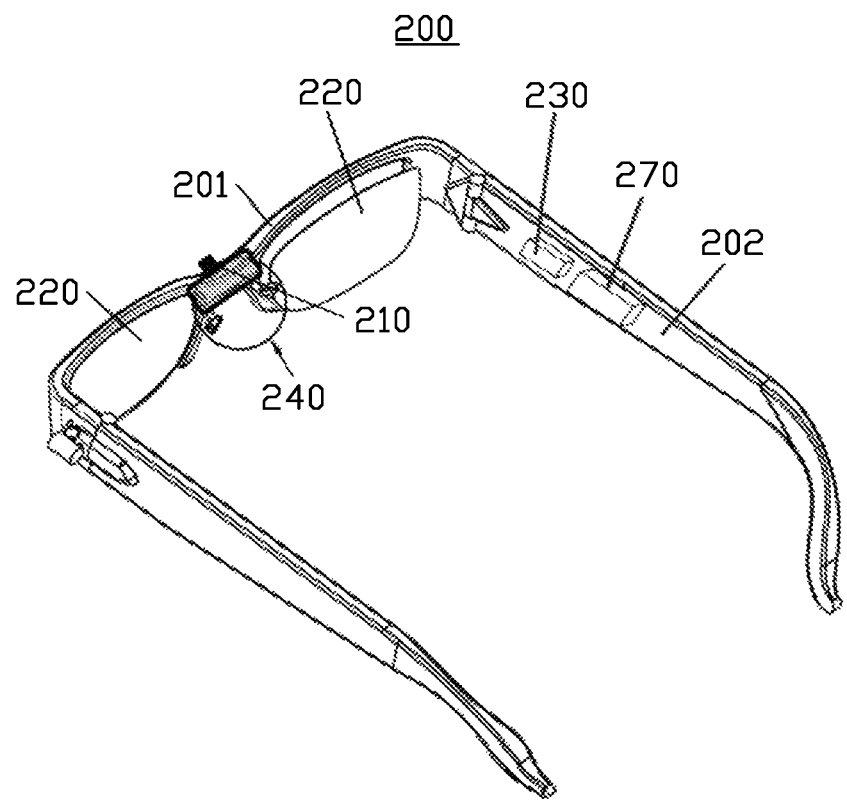
FIG. 4 illustrates a structural schematic diagram of an embodiment of the display device according to the present disclosure.

To solve the abovementioned problem, a display device including an image capturing module and a display module is provided by the present disclosure. The display device can be AR glasses, AR helmet, or AR patch, etc. for performing AR function. Referring to FIG. 4, a display device 200 being AR glasses is set for example for further description.

In at least one embodiment, the display device 200 includes an image capturing module 210, a display module 220, a frame 201, a pair of legs 202, and a switch module 230. The frame 201 is configured to mount the display module 220. The display module 220 includes a waveguide plate and an optical mechanism. The waveguide plate of the display module 220 may be glasses, the optical mechanism of the display module 220 may be mounted on the frame 201 and closes to the waveguide plate. The image capturing module 210 may be arranged in a central position of the frame 201 (where above a nose pad of the glasses). The pair of legs 202 are arranged to two sides of the frame 201 and perpendicular to the frame 201, so the user may wear the display device 200 in front of eyes through wearing the pair of legs 202, for viewing the images displayed by the display module 220. The switch module 230 is arranged on one of the pair of legs 202. In at least one embodiment, the switch module 230 can be a switch button of the display device 200 for switching on or off the display device 200 through receiving operations thereon.

Figure 5:
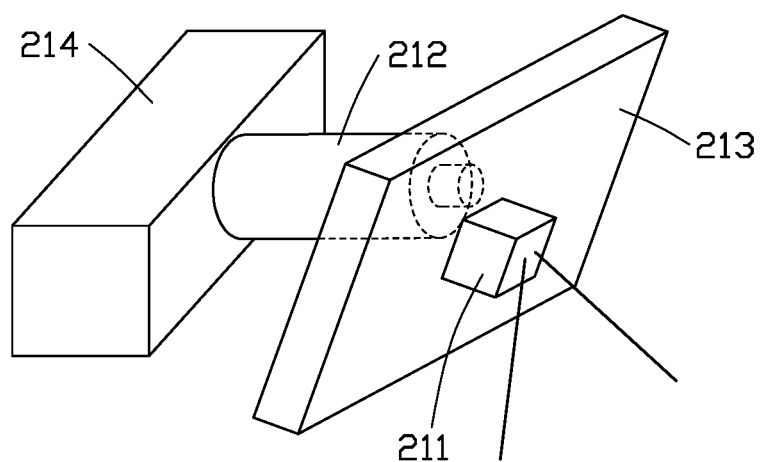
FIG. 5 illustrates a structural schematic diagram of an embodiment of an image capturing module of the display device according to the present disclosure.

Referring to FIG. 5, in at least one embodiment, the image capturing module 210 includes an image capturing unit 211 and an electrical machinery unit 212. The image capturing unit 211 may be arranged on a first securing portion 213 for being flexibly connected to the electrical machinery unit 212. The electrical machinery unit 212 may be arranged on a second securing portion 214. The second securing portion 214 is arranged in the central position of the frame 201. Thus, the electrical machinery unit 212 may be arranged on the frame 201 though the second securing portion 214. In at least one embodiment, the image capturing unit 211 may be a camera for capturing images within a capturing range thereof, the image capturing unit 211 further generates video images according to the captured images, and transmits the video images to the display module 220. The electrical machinery unit 212 may be a miniature electrical machinery for driving the image capturing unit 211, so as to adjust the position of the image capturing unit 211 to adjust the capturing field of view of the image capturing unit 211.

In at least one embodiment, the first secure portion 213 and the electrical machinery unit 212 can be connected by bolt structure. The electrical machinery unit 212 may drive the bolt structure to rotate to further drive the image capturing unit 211 to rotate, so as to adjust an angle of pitch of the image capturing unit 211 and a distance related to the frame 201, and to adjust the capturing field of view of the image capturing unit 211. When the display device 200 is applied in multiple scenes, the position of the image capturing unit 211 can be manually adjusted by the user, so the capturing field of view of the image capturing unit 211 can be in consistent with the field of view of the user.

Figure 6:
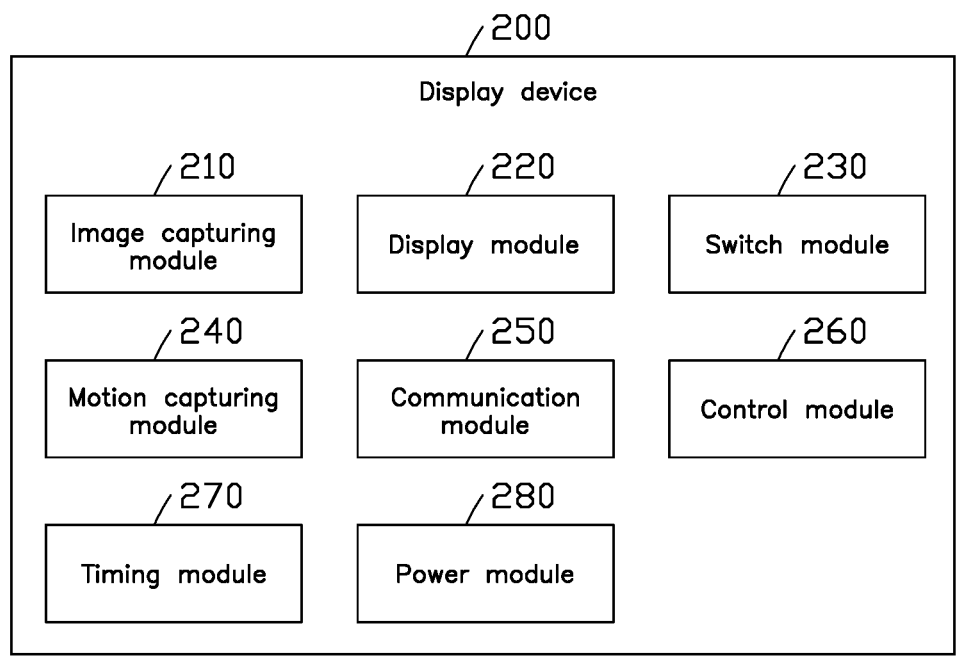
FIG. 6 illustrates a functional block schematic diagram of the display device according to the present disclosure.

Referring to FIG. 6, the display device 200 further includes a motion capturing module 240, a communication module 250, and a control module 260.

Figure 7:
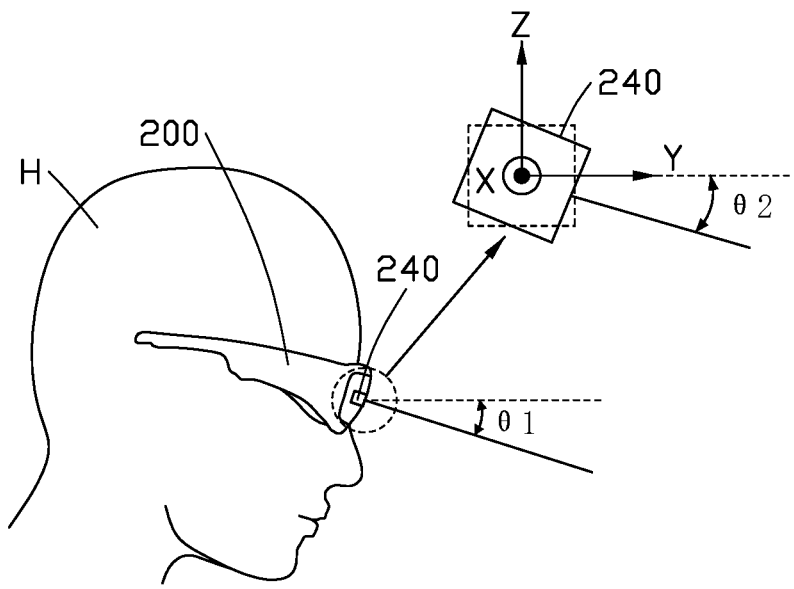
FIG. 7 illustrates a schematic diagram of an embodiment of a scene of the display device according to the present disclosure.

In detail, referring to FIG. 7, the motion capturing module 240 is configured to capture a posture of the user's head H when the user uses the display device 200, and obtain an inclined angle θ1 through measuring the posture of the user's head H. When the user is in the horizontal view scene, the posture of the user's head is a horizontal posture. When the user is in the downward view scene or the upward view scene, the posture of the user's head is an inclined posture, which has an angle of inclination related to the horizontal posture.

In at least one embodiment, the motion capturing module 240 may be an Inertial Measurement Unit (IMU). The motion capturing module 240 may preset a three-dimensional coordinate system. The motion capturing module 240 is configured to obtain an accelerated velocity and an angular velocity of each axis in the three-dimensional coordinate system in motion status, and obtain a posture angle of each axis according to the accelerated velocity and the angular velocity of each axis. In detail, the motion capturing module 240 may be arranged in the central portion of the frame 201, when the user is in the horizontal view scene, an X-axis, a Y-axis, and a Z-axis of the three-dimensional coordinate system of the motion capturing module 240 are coincident with coordinate directions of a motion axes.

Since when the user is in the downward view scene, the motion capturing module 240 rotates related to the X-axis, so the motion capturing module 240 obtains the accelerated velocity and the angular velocity of the X-axis, so as to obtain the angle of pitch, and further obtain a posture angle θ2 of the X-axis. It should be known that, when the user is in the upward view scene, that is when the user looks up, the posture angle θ2 of the X-axis can be equivalent to the inclined angle θ1.

In at least one embodiment, the motion capturing module 240 may communicate with the control module 260 through the communication module 250, to transmit data including the inclined angle θ1 to the control module 260. In at least one embodiment, the communication module 250 can be a Bluetooth communication chip, which may be on one of the pair of legs 202. The display device 200 may further communicate with other mobile terminals (such as tablet computers, laptop computers, mobile phones, personal digital assistant (PDA), etc.) through the communication module 250, to control the angle of the image capturing module 210 by predetermined functional modules of the mobile terminals.

The control module 260 is configured to obtain the inclined angle θ1 and compare the inclined angle θ1 to a predetermined angle, to obtain an angle difference between the inclined angle θ1 and the predetermined angle. The control module 260 is further configured to determine whether the angle difference is greater than an angle threshold value, to determine whether the user is in the downward view scene or the upward view scene. In at least one embodiment, the angle difference may be an absolute value of the difference value between the inclined angle θ1 and the predetermined angle.

In detail, when the angle difference is smaller than or equal to the angle threshold value, the control module 260 determines that the user is not in the downward view scene or the upward view scene. When the angle difference is greater than the angle threshold value, the control module 260 determines that the user is in the downward view scene or the upward view scene. Furthermore, when the control module 260 determines that the user is in the downward view scene or the upward view scene, the control module 260 transmits a control signal to the electrical machinery unit 212 according to the angle difference, to control the running of the electrical machinery unit 212, so the electrical machinery unit 212 drives the image capturing unit 211 to move, to adjust the position of the image capturing unit 211, rendering a degree of overlapping of the field of view of the image capturing module 210 and the field of view of the user reaches a predetermined degree of overlapping, so the user may see the virtual image displayed in corresponding position of the real world environment image. The degree of overlapping means a percentage of an area of the effective range F1 occupies the area of the capturing area 1201. For instance, when all of the area of the capturing area 1201 is the area of the effective range F1, the degree of overlapping can be 100%. When the area of the effective range F1 occupies 30% of the area of the capturing area 1201, the degree of overlapping can be 30%.

Based on several experimental data obtained in the laboratory, a correspondence table of different angle differences and the inclined angles of the image capturing unit 211 can be determined. In at least one embodiment, based on a look-up table preset in the display device 200, when the angle difference is within a first predetermined angle section, the control module 260 controls the electrical machinery unit 212 to drive the image capturing unit 211, to adjust the inclined angle of the image capturing unit 211 to a first angle, so the degree of overlapping of the field of view of the image capturing module 210 and the field of view of the user reaches the predetermined degree of overlapping. When the angle difference is within a second predetermined angle section, the control module 260 controls the electrical machinery unit 212 to drive the image capturing unit 211, to adjust the inclined angle of the image capturing unit 211 to a second angle, so the degree of overlapping of the field of view of the image capturing module 210 and the field of view of the user reaches the predetermined degree of overlapping.

In at least one embodiment, the predetermined degree of overlapping may be a degree of overlapping of the field of view of the image capturing module 210 and the field of view of the user when the degree of overlapping of the field of view of the image capturing module 210 and the field of view of the user reaches 90%. In detail, the field of view of the user may be obtained by experimental measurement in the laboratory.

In at least one embodiment, the display device 200 further includes a timing module 270. The timing module 270 is configured to time the display device 200 maintains the angle difference being greater than the angle threshold value, that is when the control module 260 determines the user is in the downward view scene or the upward view scene, timing a time period of the user being in the downward view scene or the upward view scene, to obtain an inclined time and transmit the inclined time to the control module 260. In at least one embodiment, the timing module 270 may be a timer.

The control module 260 is further configured to receive the inclined time transmitted by the timing module 270 and compare the inclined time to a predetermined time period, to determine whether the time period of the user being in the downward view scene or the upward view scene reaches the predetermined time period. In detail, when the inclined time is greater than or equal to the predetermined time period, the control module 260 determines the time period of the user being in the downward view scene or the upward view scene reaches the predetermined time period, the control module 260 further transmits a control signal to the electrical machinery unit 212 according to the angle difference to control the electrical machinery unit 212 to run, the electrical machinery unit 212 drives the image capturing unit 211 to move, to adjust the position of image capturing unit 211, rendering the capturing range of the image capturing unit 211 is in accordant with the field of view of the user. Thus, through setting the timing module 270, a probability of the display device 200 mistakenly triggering to adjust the position of the image capturing module 210 may be decreased.

In at least one embodiment, the control module 260 may include a control chip arranged on one of the pair of legs 202. In detail, the control module 260 may store the predetermined angle, the angle threshold value, and the predetermined time period. The predetermined angle may be 0°, the angle threshold value may be 5°, and the predetermined time period may be 5 second.

In at least one embodiment, the control module 260 may include an image process chip. The image capturing module 210 captures an environment image in its own field of view after the position is adjusted, and further transmits the captured environment image to the control module 260, the control module 260 processes the captured environment image to obtain a virtual image corresponding to the environment image. The display module 220 further display the environment image and the virtual image, so the user may see the virtual image displayed in corresponding position of the environment image.

In at least one embodiment, the display device 200 further includes a power module 280 for providing electric power for the display device 200. In at least one embodiment, the power module 280 is connected to the switch module 230, when the switch module 230 is switched on, the power module 280 provides electric power for the display module 220, the display module 220 is powered on; when the switch module 230 is switched off, the power module 280 stops providing electric power for the display module 220, the display module 220 is powered off.

In other embodiments, the display module 220 may further include a transparent display, such as a LED display, an LCD display, etc.

In other embodiments, the motion capturing module 240 is not limited to the IMU, such as, the motion capturing module 240 may be a sensor circuit integrated based on a magneto resistance sensor and an accelerometer for detecting the angle of pitch.

The display device 200 of the present disclosure, by the motion capturing module 240 captures the posture of the user's head when the user is using the display device 200, obtains the inclined angle θ1 through measuring the posture of the user's head. The control module 260 compares the inclined angle θ1 to the predetermined angle, to obtain the angle difference between the inclined angle θ1 and the predetermined angle. The control module 260, when the angle difference is greater than the angle threshold value is determined, controls the image capturing module 210 to adjust the position according to the angle difference, rendering the degree of overlapping of the field of view of the image capturing module 210 and the field of view of the user reaches the predetermined degree of overlapping, so usage scenes of the display device 200 may be broader, and better user experience may be provided.

Figure 8:
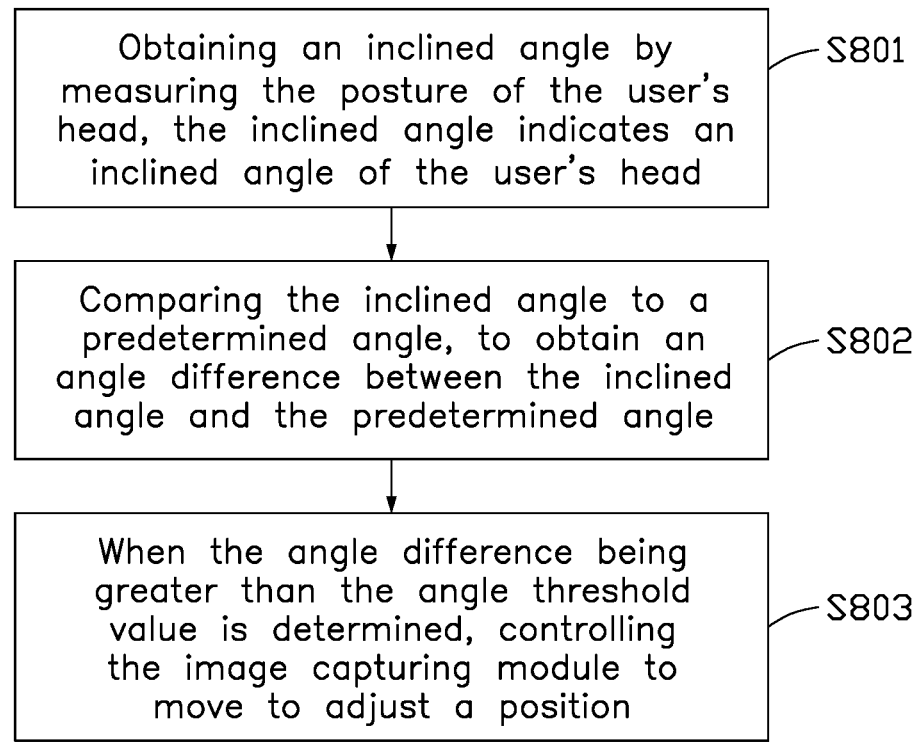
FIG. 8 illustrates a flowchart of an embodiment of a method for modulating capturing view according to the present disclosure.

FIGS. 7 and 8 illustrate flowcharts of at least one embodiment of a method for modulating capturing view, which is applied in the display device 200, the method may include:

At block S801, obtaining an inclined angle θ1 by measuring the posture of the user's head. The inclined angle θ1 indicates an inclined angle of the user's head.

In detail, the motion capturing module 240 is configured to capture a posture of the user's head H when the user uses the display device 200, and obtain the inclined angle θ1 through measuring the posture of the user's head H. When the user is in the horizontal view scene, the posture of the user's head is a horizontal posture. When the user is in the downward view scene or the upward view scene, the posture of the user's head is an inclined posture, which has an angle of inclination related to the horizontal posture.

In at least one embodiment, the motion capturing module 240 may be an IMU. The motion capturing module 240 may preset a three-dimensional coordinate system. The motion capturing module 240 is configured to obtain an accelerated velocity and an angular velocity of each axis in the three-dimensional coordinate system in motion status, and obtain a posture angle of each axis according to the accelerated velocity and the angular velocity of each axis. In detail, the motion capturing module 240 may be arranged in the central portion of the frame 201, when the user is in the horizontal view scene, an X-axis, a Y-axis, and a Z-axis of the three-dimensional coordinate system of the motion capturing module 240 are coincident with coordinate directions of a motion axes. Since when the user is in the downward view scene, the motion capturing module 240 rotates related to the X-axis, so the motion capturing module 240 obtains the accelerated velocity and the angular velocity of the X-axis, so as to obtain the angle of pitch, and further obtain a posture angle θ2 of the X-axis. It should be known that, when the user is in the upward view scene, that is when the user looks up, the posture angle θ2 of the X-axis can be equivalent to the inclined angle θ1.

At block S802, comparing the inclined angle θ1 to a predetermined angle, to obtain an angle difference between the inclined angle θ1 and the predetermined angle.

The control module 260 is configured to obtain the inclined angle θ1 and compare the inclined angle θ1 to the predetermined angle, to obtain the angle difference between the inclined angle θ1 and the predetermined angle. The control module 260 is further configured to determine whether the angle difference is greater than an angle threshold value, to determine whether the user is in the downward view scene or the upward view scene. In at least one embodiment, the angle difference may be an absolute value of the difference value between the inclined angle θ1 and the predetermined angle.

In detail, when the angle difference is smaller than or equal to the angle threshold value, the control module 260 determines that the user is not in the downward view scene or the upward view scene. When the angle difference is greater than the angle threshold value, the control module 260 determines that the user is in the downward view scene or the upward view scene.

At block S803, when the angle difference being greater than the angle threshold value is determined, controlling the image capturing module 210 to move to adjust a position.

The control module 260, when determining that the user is in the downward view scene or the upward view scene, transmits a control signal to the electrical machinery unit 212 according to the angle difference, to control the running of the electrical machinery unit 212, so the electrical machinery unit 212 drives the image capturing unit 211 to move, to adjust the position of the image capturing unit 211, rendering a degree of overlapping of the field of view of the image capturing module 210 and the field of view of the user reaches a predetermined degree of overlapping. In at least one embodiment, when the angle difference is within a first predetermined angle section, the control module 260 controls the electrical machinery unit 212 to drive the image capturing unit 211, to adjust the inclined angle of the image capturing unit 211 to a first angle, so the degree of overlapping of the field of view of the image capturing module 210 and the field of view of the user reaches the predetermined degree of overlapping. When the angle difference is within a second predetermined angle section, the control module 260 controls the electrical machinery unit 212 to drive the image capturing unit 211, to adjust the inclined angle of the image capturing unit 211 to a second angle, so the degree of overlapping of the field of view of the image capturing module 210 and the field of view of the user reaches the predetermined degree of overlapping.

Figure 9:
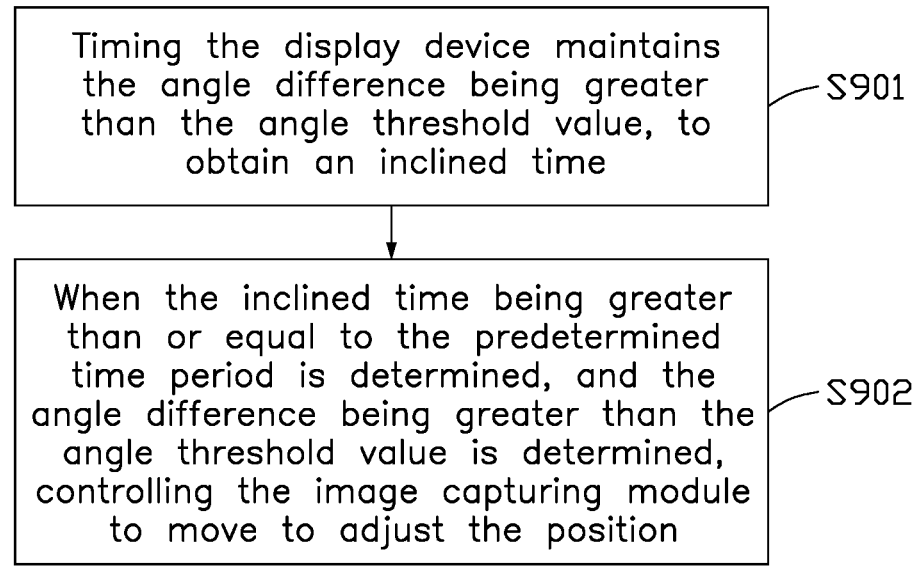
FIG. 9 illustrates another flowchart of an embodiment of the method for modulating capturing view according to the present disclosure.

In at least one embodiment, the predetermined degree of overlapping may be a degree of overlapping of the field of view of the image capturing module 210 and the field of view of the user when the degree of overlapping of the field of view of the image capturing module 210 and the field of view of the user reaches 90%. In detail, the field of view of the user may be obtained by experimental measurement in the laboratory. Referring to FIG. 9, the block S803 may further include block S901 and block S902.

At block S901, timing the display device 200 maintains the angle difference being greater than the angle threshold value, to obtain an inclined time.

In detail, the timing module 270 is configured to time the display device 200 maintains the angle difference being greater than the angle threshold value, that is when the control module 260 determines the user is in the downward view scene or the upward view scene, timing a time period of the user being in the downward view scene or the upward view scene, to obtain the inclined time and transmit the inclined time to the control module 260. In at least one embodiment, the timing module 270 may be a timer.

The control module 260 is further configured to receive the inclined time transmitted by the timing module 270 and compare the inclined time to a predetermined time period, to determine whether the time period of the user being in the downward view scene or the upward view scene reaches the predetermined time period.

In detail, when the inclined time is smaller than the predetermined time period, the control module 260 determines the user is not in the downward view scene or the upward view scene. When the inclined time is greater than or equal to the predetermined time period, the control module 260 determines the time period of the user being in the downward view scene or the upward view scene reaches the predetermined time period.

At block S902, when the inclined time being greater than or equal to the predetermined time period is determined, and the angle difference being greater than the angle threshold value is determined, controlling the image capturing module 210 to move to adjust the position.

In detail, when the inclined time is greater than or equal to the predetermined time period, the control module 260 determines the time period of the user being in the downward view scene or the upward view scene reaches the predetermined time period, the control module 260 further transmits a control signal to the electrical machinery unit 212 according to the angle difference to control the electrical machinery unit 212 to run, the electrical machinery unit 212 drives the image capturing unit 211 to move, to adjust the position of image capturing unit 211, rendering the capturing range of the image capturing unit 211 is in accordant with the field of view of the user.

In at least one embodiment, the control module 260 may include a control chip arranged on one of the pair of legs 202. In detail, the control module 260 may store the predetermined angle, the angle threshold value, and the predetermined time period. The predetermined angle may be 0°, the angle threshold value may be 5°, and the predetermined time period may be 5 second.

A non-transitory computer-readable storage medium including program instructions for causing the computer apparatus (such as personal computer, device, or network device, etc.) or the processor to perform the method for modulating capturing view is also disclosed.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A display device wearable on a user's head, the display device comprising:

an image capturing module configured to capture an environment image, the image capturing module movably arranged;

a motion capturing module configured to obtain an inclined angle through measuring a posture of the user's head, the inclined angle indicating an inclined angle of the user's head in a vertical direction related to a horizontal line;

a control module configured to compare the inclined angle to a predetermined angle, to obtain an angle difference between the inclined angle and the predetermined angle, the control module further configured to control the image capturing module to move to adjust a position when the angle difference is greater than an angle threshold value, rendering a degree of overlapping of a field of view of the image capturing module and a field of view of the user reaches a predetermined degree of overlapping;

a display module;

a frame configured to mount the display module;

a pair of legs arranged to two sides of the frame respectively; wherein the image capturing module and the motion capturing module are arranged in a central position of the frame; and a first securing portion and a second securing portion, wherein the image capturing module comprising:

an image capturing unit configured to capture the environment image and transmit the environment image to the control module; and an electrical machinery unit configured to drive the image capturing unit to move in a control of the control module, to adjust a position of the image capturing unit;

the control module further configured to process the environment image to obtain a virtual image corresponding to the environment image, the display module configured to display the environment image and the virtual image;

the image capturing unit is arranged on the first securing portion, the first securing portion is flexibly connected to the electrical machinery unit, the electrical machinery unit is arranged on the second securing portion, and the second securing portion is arranged in the central position of the frame; wherein the electrical machinery unit, by driving the first securing portion, drives the image capturing unit to move;

the first securing portion and the electrical machinery unit are connected by bolt structure, the electrical machinery unit drives the bolt structure to rotate to further drive the image capturing unit to rotate.

2. The display device according to claim 1, further comprising a timing module, wherein the timing module is configured to time the display device maintaining the angle difference greater than the angle threshold value, to obtain an inclined time;

the control module is further configured to control the image capturing module to move to adjust the position when the inclined time is greater than or equal to a predetermined time period and the angle difference is greater than the angle threshold value, the control module controls the image capturing module to move to adjust the position, rendering the degree of overlapping of the field of view of the image capturing module and the field of view of the user reaches the predetermined degree of overlapping.

3. The display device according to claim 1, further comprising a switch module, wherein the switch module is configured to switch on or off the display device;

the switch module and the control module are arranged on one of the pair of legs.

4. The display device according to claim 1, wherein the image capturing unit is further configured to capture images within a capturing range thereof and generate video images according to the images, the display module is further configured to display the video images.

5. The display device according to claim 1, wherein the motion capturing module is an Inertial Measurement Unit.

6. A method for modulating capturing view applied in a display device, the display device is wearable on a user's head, the display device is provided with an image capturing module for capturing an environment image, the method comprising:
obtaining an inclined angle by measuring a posture of the user's head, the inclined angle indicating an inclined angle of the user's head in a vertical direction related to a horizontal line;
comparing the inclined angle to a predetermined angle, to obtain an angle difference between the inclined angle and the predetermined angle; and
controlling the image capturing module to move to adjust a position when the angle difference is greater than an angle threshold value;
wherein the display device is further provided with a display module, a frame configured to mount the display module, a pair of legs arranged to two sides of the frame respectively, a first securing portion and a second securing portion, the image capturing module and the motion capturing module are arranged in a central position of the frame; the image capturing module is provided with an image capturing unit and an electrical machinery unit, the image capturing unit is arranged on the first securing portion, the first securing portion is flexibly connected to the electrical machinery unit, the electrical machinery unit is arranged on the second securing portion, and the second securing portion is arranged in the central position of the frame, the first securing portion and the electrical machinery unit are connected by bolt structure, the method further comprises:
controlling the image capturing unit to capture the environment image and transmit the environment image to the control module;
controlling the electrical machinery unit to drive the bolt structure to rotate to further drive the image capturing unit to move in a control of the control module, to adjust a position of the image capturing unit;
processing the environment image to obtain a virtual image corresponding to the environment image by the electrical machinery unit; and
displaying the environment image and the virtual image by the display module.

7. The method according to claim 6, wherein controlling the image capturing module to move to adjust the position when the angle difference is greater than the angle threshold value, further comprises:
timing the display device maintaining the angle difference greater than the angle threshold value, to obtain an inclined time; and
controlling the image capturing module to move to adjust the position when the inclined time is greater than or equal to a predetermined time period and the angle difference is greater than the angle threshold value.

8. The method according to claim 6, wherein the display device is provided with a motion capturing module configured to obtain the inclined angle through measuring the posture of the user's head.

9. The method according to claim 6, wherein controlling the image capturing module to move to adjust the position when the angle difference is greater than the angle threshold value, further comprises:
rendering a degree of overlapping of a field of view of the image capturing module and a field of view of the user reaches a predetermined degree of overlapping.

10. The method according to claim 6, further comprising:
capturing images within a capturing range of the image capturing unit and generating video images according to the images by the image capturing unit; and
displaying the video images by the display module.

11. The method according to claim 6, further comprising:
determining that the user is not in a downward view scene or an upward view scene when the angle difference is smaller than or equal to the angle threshold value; and
determining that the user is in the downward view scene or the upward view scene when the angle difference is greater than the angle threshold value.

12. A non-transitory computer readable medium comprising program instructions for causing a display device to perform at least following steps:
obtaining an inclined angle by measuring a posture of the user's head, the inclined angle indicating an inclined angle of the user's head in a vertical direction related to a horizontal line;
comparing the inclined angle to a predetermined angle, to obtain an angle difference between the inclined angle and the predetermined angle; and
controlling the image capturing module to move to adjust a position when the angle difference is greater than an angle threshold value;
wherein the display device is further provided with a display module, a frame configured to mount the display module, a pair of legs arranged to two sides of the frame respectively, a first securing portion and a second securing portion, the image capturing module and the motion capturing module are arranged in a central position of the frame; the image capturing module is provided with an image capturing unit and an electrical machinery unit, the image capturing unit is arranged on the first securing portion, the first securing portion is flexibly connected to the electrical machinery unit, the electrical machinery unit is arranged on the second securing portion, and the second securing portion is arranged in the central position of the frame, the first securing portion and the electrical machinery unit are connected by bolt structure, further comprises:
controlling the image capturing unit to capture the environment image and transmit the environment image to the control module;
controlling the electrical machinery unit to drive the bolt structure to rotate to further drive the image capturing unit to move in a control of the control module, to adjust a position of the image capturing unit;
processing the environment image to obtain a virtual image corresponding to the environment image by the electrical machinery unit; and
displaying the environment image and the virtual image by the display module.

13. The non-transitory computer readable medium according to claim 12, further comprising:

timing the display device maintaining the angle difference greater than the angle threshold value, to obtain an inclined time; and controlling the image capturing module to move to adjust the position when the inclined time is greater than or equal to a predetermined time period and the angle difference is greater than the angle threshold value.

14. The non-transitory computer readable medium according to claim 12, further comprising:

capturing images within a capturing range of the image capturing module and generating video images according to the images; and displaying the video images.

15. The non-transitory computer readable medium according to claim 12, further comprising:

determining that the user is not in a downward view scene or an upward view scene when the angle difference is smaller than or equal to the angle threshold value; and determining that the user is in the downward view scene or the upward view scene when the angle difference is greater than the angle threshold value.

\* \* \* \* \*